United States Patent [19]

Cermak

[11] 4,049,324
[45] Sept. 20, 1977

[54] ELECTRO-PNEUMATIC EMERGENCY BRAKE CONTROL SYSTEM FOR A VEHICLE TRAIN

[76] Inventor: Eduard Cermak, Haydnstrasse 6, 71 Heilbronn, Germany

[21] Appl. No.: 632,397

[22] Filed: Nov. 17, 1975

[30] Foreign Application Priority Data

May 28, 1975 Germany .............................. 2420665

[51] Int. Cl.² .............................................. B60T 13/16
[52] U.S. Cl. ........................................ 303/7; 188/3 R; 303/15; 303/47; 303/63; 303/DIG. 2
[58] Field of Search ................. 188/3 R; 303/3, 7, 15, 303/40, 47, 63, DIG. 2, 20

[56] References Cited

U.S. PATENT DOCUMENTS

| | | | |
|---|---|---|---|
| 3,726,307 | 4/1973 | Carman et al. | 303/20 X |
| 3,747,992 | 7/1973 | Schnipke | 303/3 X |
| 3,819,238 | 6/1974 | Cermak | 303/7 X |
| 3,880,472 | 4/1975 | Lewis et al. | 303/7 |

*Primary Examiner*—Stephen G. Kunin
*Attorney, Agent, or Firm*—Warren, Chickering & Grunewald

[57] ABSTRACT

There is provided a brake system for a vehicle train which includes a tractor and a trailer, a source of high pressure air connected through an air control line to a pneumatic brake with the air control line in the tractor being connected to a fast-acting pressure switch which is activated by a higher pressure and a slow-acting pressure switch which is activated by a lower pressure, and with the fast-acting pressure switch operatively connected to open a valve to supply high pressure air directly to the trailer brake, and with said low pressure switch operatively connected to open the circuit which includes the fast-acting pressure switch.

4 Claims, 1 Drawing Figure

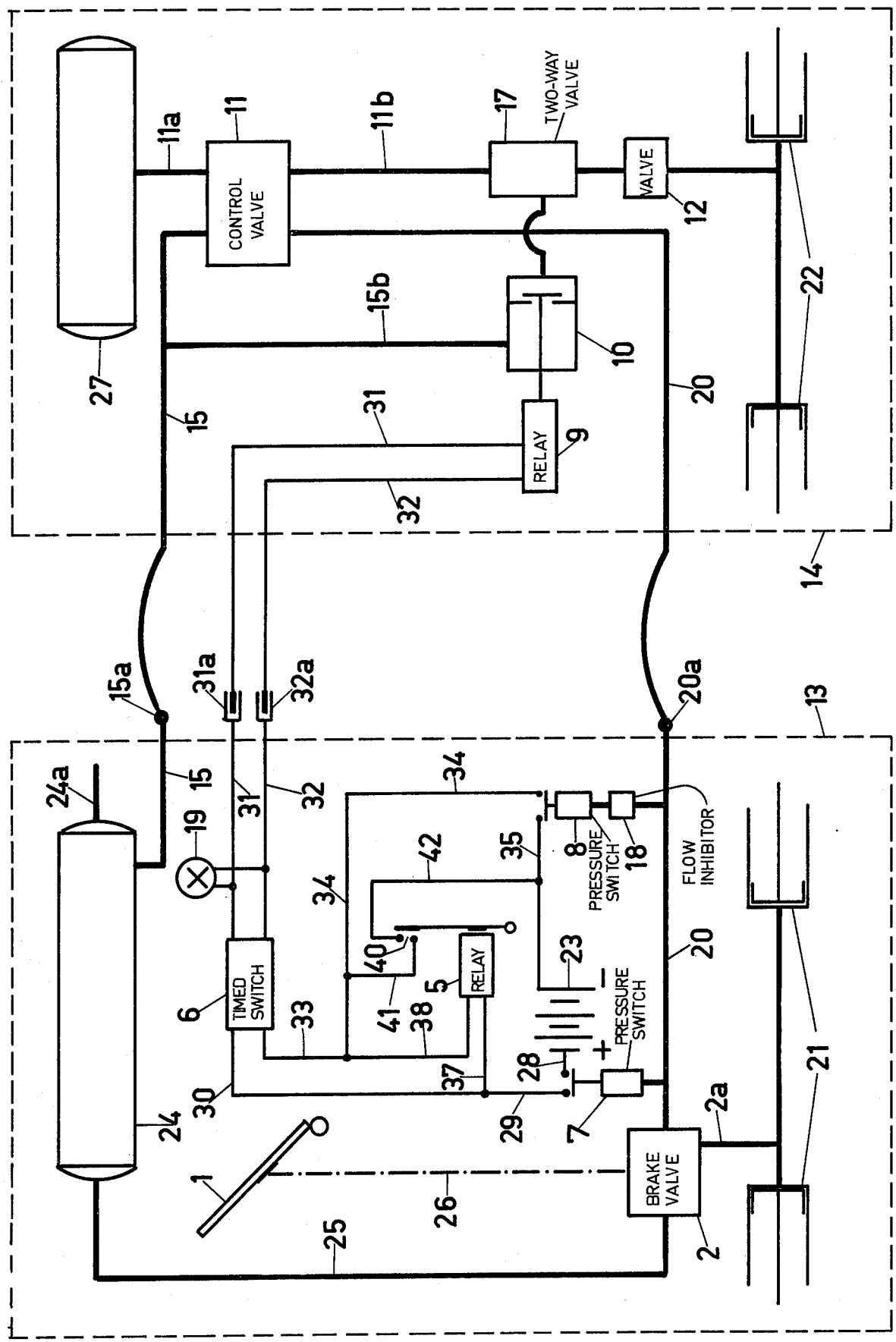

ELECTRO-PNEUMATIC EMERGENCY BRAKE CONTROL SYSTEM FOR A VEHICLE TRAIN

BACKGROUND OF THE INVENTION

Vehicle trains, particularly tractor-trailer combinations for use on roads, employ brakes both in the tractor and in the trailer to improve the ability to stop the vehicle train. For ordinary stops, the brakes are applied gradually; and the tractor brakes and trailer brakes take effect almost simultaneously.

However, in emergencies when the brakes are applied rapidly, the high pressure air passing through the air control line will reach the tractor brakes before it reaches the trailer brakes. Accordingly, the tractor brakes are applied first, and the trailer tends to push the tractor in the brief interval before its brakes are applied. When such a situation occurs, if the tractor and trailer are not almost perfectly aligned, the trailer will push the tractor off to the side, bending the connection between the tractor and the trailer sharply to produce a dangerous and damaging situation known in the trucking business as jackknifing of the rig.

In the past, jackknifing has been avoided by brake arrangements where trailer brakes are applied first, but such arrangements are unsatisfactory for other reasons, including undue strain on the coupling between the tractor and the trailer.

THE INVENTION

This invention is a brake system which permits brakes to be applied simultaneously during slow, normal stops or during emergency or panic stops. Thus, in the present invention jackknifing is completely avoided, but normal operation is not corrupted to accommodate for those few emergency instances when there could be jackknifing.

The brake system of this invention includes a source of high pressure air connected through a control line to operate a pneumatic brake system in a tractor vehicle and in a trailer vehicle. The source of high pressure air is conventional, and it usually contains one or more reservoirs for holding air at a predetermined high pressure and one or more compressors for supplying air at high pressure to the reservoirs. Ordinarily, the compressors take power from the engine that operates the tractor.

The high pressure air source is connected through a control line to conventional pneumatic brakes that employ ordinary equipment to stop a rotating wheel. The control line in the brake system of this invention is connected to a fast-acting pressure switch that is preferably located near the valve through which high pressure air enters the air control line. The fast-acting pressure switch is an ordinary pressure switch that can be employed in an electric circuit and one that is activated to open or close the circuit when a predetermined air pressure is reached within the body of the switch.

The brake of this invention also includes a slow-acting pressure switch, preferably located downstream from the fast-acting pressure switch. The slow-acting pressure switch is responsive to a lower pressure than the fast-acting pressure switch. In other words, the slow-acting pressure switch is set so that it is made operative when a predetermined pressure is reached within the switch, and the predetermined pressure which operates the slow-acting switch is a lower pressure than the predetermined pressure that operates the fast-acting switch.

When the fast-acting pressure switch is actuated, it closes the circuit which electrically opens one or more valves to supply high pressure to the brake system in the trailer vehicle directly rather than through the usual valve system. The slow-acting pressure switch is connected, when it is actuated by pressure, to open the circuit that is closed by the fast-acting pressure switch. The system of this invention may include additional elements, one particularly preferred element being a timing arrangement whereby operation of the fast-acting pressure switch prior to operation of the slow-acting pressure switch will cause the brake system of the trailer vehicle to function for a specific, predetermined time interval before it is interrupted by the opening of the slow acting pressure switch.

BRIEF DESCRIPTION OF THE DRAWING

The operation of the brake system of this invention can be best described with reference to the accompanying drawing which is a schematic representation of one brake system embodying this invention.

DETAILED DESCRIPTION OF THE INVENTION

The brake system illustrated in the drawing includes elements located in a tractor section, generally designated 13, and elements located in a trailer section, generally designated 14. The tractor section has conventional pneumatic brakes with the usual lines and cylinders, generally designated 21, while the trailer section has conventional brake, generally designated 22. The tractor has a reservoir 24 with an inlet line 24a that is connected to a conventional compressor. The compressor and the control system for regulating the pressure in vessel 24 are well known and are not illustrated. The air pressure in vessel 24 is maintained at a predetermined level, and that level of air pressure is also maintained in line 25 which leads to the tractor brake system and in line 15 which leads to the trailer brake system. Line 15 includes a coupling 15a to carry the compressed air from the tractor to the trailer and a vessel 27 in which a capacity of high pressure air is maintained. Normally the pressure in vessel 27 is the same as the pressure in the vessel 24 and is maintained at that pressure through the action of conventional trailer control valve 11 which diverts compressed air at the pressure of line 15 into vessel 27 when the pressure in vessel 27 is low while preventing air from entering line 11b through which air passes to actuate the brake system 22.

An air control line 20 is normally vented and therefore is at atmospheric pressure. Air pressure in air control line 20 passes through coupling 20a toward trailer control valve 11. When high pressure air passes into air control line 20, it passes through valve 11, line 11b, valve 12, and ultimately causes the operation of trailer brake 22. The pressure in line 2a which leads from valve 2, to be described in more detail hereinafter, is the same as the pressure in line 20, i.e., the air pressure in line 2a is normally atmospheric pressure in that the line is vented; but when brakes are applied to stop the tractor-trailer combination, the presssure in line 2a increases as the brakes are applied.

The system illustrated herein operates differently depending upon whether the brakes are applied rapidly or slowly. To distinguish between the two situations, the system will first be described with reference to slow application of the brakes as when the vehicle is stopped normally where the need to stop it can be anticipated by the driver. In such a situation it is desirable that the tractor brakes and the trailer brakes be applied substantially simultaneously. The brakes are applied by depressing brake pedal 1 which actuates a mechanical linkage, generally designated 26, which in turn actuates brake valve 2 which supplies compressed air both to the tractor brakes and to the trailer brakes to effect stopping the vehicle. In normal, non-emergency stops, brake pedal 1 is depressed slowly, and the pressure in both line 20 and in line 2a increases so slowly that the longer distance the air must flow to reach trailer brake 22 is of no consequence. As a result, the pressure operating brakes 21 and the pressure operating brakes 22 is substantially the same, and the tractor brake and the trailer brake are applied substantially simultaneously. Connected close to valve 2 is a fast-acting pressure switch 7 that is preset to close at a relatively high pressure, almost at the maximum pressure, in line 25. Downstream from the pressure switch 7 is a pressure switch 8 which is a slow-acting pressure switch and which is preset to operate at a low pressure: for example, one half the pressure in line 25. The slow action of the pressure switch 8 may be accomplished, for example, by an element 18 which inhibits the flow of air from line 20 to pressure switch 8. This element could be, for example, an orifice of a size suitable to introduce the desired delay of air flow from line 20 into pressure switch 8.

In normal operation of the brakes, when the pressure in line 20 rises slowly, the impediment to the flow of air through element 18 is not significant; and the pressure in pressure switch 8 rises at about the same rate as the pressure in pressure switch 7, whereby pressure switch 8 is actuated earlier in time (at a lower pressure) than pressure switch 7. Pressure switch 8 operates to open the switch 8, whereby the circuit in which switch 8 exists becomes an open circuit. When the pressure reaches the predetermined level at which pressure switch 7 is actuated, pressure switch 7 closes the circuit that it is in, whereby electricity can flow. However, both pressure switch 7 and pressure switch 8 are in the same circuit, and if pressure switch 7 closes the circuit after pressure switch 8 has opened it, the circuit will be inoperative and the closing of pressure switch 7 will have no effect. Accordingly, for normal stops, the brake system will function as though pressure switch 7 and pressure switch 8 did not exist; and the tractor-trailer combination will stop normally as it would if the device of this invention were not present.

The operation of the device of this invention in an emergency or panic stop, however, is quite different as will be described below. In an emergency stop, pedal 1, acting through mechanical linkage 26, is depressed rapidly so that valve 2 is almost completely open instantly. As a result, the high pressure air in line 25 surges into control line 20. The fast flow of air through control line 20 causes a significant pressure drop across control line 20 so that brakes 21 would normally be actuated much quicker than brakes 22 which are far downstream of the line 2a. However, when a surge of high pressure passes through line 2, the pressure in pressure switch 7 rises rapidly and closes the circuit in which pressure switch 7 exists. However, pressure switch 8 which is downstream of pressure switch 7 and which operates more slowly because of delay element 18 takes some time to act. Accordingly, the circuit closed by pressure switch 7 remains closed until pressure switch 8 reaches the pressure at which it will open the circuit. When the circuit including pressure switch 7 is closed, the electrically operated relay 9 will function straight through valve 10 which passes high pressure air directly from line 15 through line 15b and into two-way valve 17 which supplies the control 12 with high pressure air immediately so that brakes 22 are applied substantially at the same time as brakes 21. A refinement of this effect is obtained by other elements which provide that straight through valve 10 remain open for a predetermined time period to insure that brakes 22 are applied completely and for the proper period of time before the circuit operating relay 9 is broken.

When pressure switch 7 closes the circuit before operation of pressure switch 8, a complete circuit is obtained wherein current flowing from battery 23 passes through line 28 and through the switch 7 to line 29. Line 29 branches in two directions, in one direction passing through line 30 and through timed switch 6 from which it flows through line 31 which includes coupling 31a and operates the relay 9 described hereinabove. The return circuit through relay 9 goes through line 32 and coupling 32a and back through timed switch 6 wherefrom the circuit is completed through line 33, line 34, through the pressure switch 8, and through line 35 completing the circuit to the battery 23. Simultaneously, the branch 37 passes through relay 5 and line 38 whereby the relay closes the switch 40 which in turn permits current to pass through the lines 41 and 42 to complete the circuit back to battery 23. In operation, if the switch 7 closes before the switch 8 opens, as in an emergency stop, the flow of current through line 30 and line 37 will cause the valve 10 to open and the switch 40 to close. The circuit may follow the route through line 34, switch 8 and line 35; or it may follow the route through line 41, switch 40 and line 42; and in either event the relay 9 will be actuated. Thus, if during an emergency stop, valve 7 closes just instantaneously prior to the opening of valve 8, nevertheless relay 9 will be actuated for a predetermined time set into timed switch 6 so that the operation of the brakes 22 from air passed through straight-through valve 10 will continue for a long enough time period to be effective to avoid jackknifing. When timed switch 6 maintains relay 9 energized for that predetermined time period, timed switch 6 opens which breaks the entire circuit so that switch 40 will open and relay 9 is no longer energized. As a result, the normal operation of the brakes is resumed.

As soon as pressure is vented from line 20, as when the brakes are released by allowing brake pedal 1 to rise, pressure switch 7 opens first because the release of air from the pressure switch 7 is rapid, and pressure switch 8, somewhat later, closes so that the entire circuit is reset so that it will function normally under normal braking conditions, but will function to apply trailer brakes 22 very rapidly under emergency braking conditions.

Although the system of this invention has been described with reference to a tractor-trailer combination for use on roads, it is applicable to any towed vehicle having a braking system. Accordingly, it could be employed in railroad trains and in systems where multiple trailers are employed with a single tractor. The vehicle brake system of this invention is particularly advantageous because it may be installed in already-existent braking systems with minor modifications that are easily accommodated. In other words, it is not necessary to build a vehicle especially to have the brake system of this invention in that very few parts that are easily installed into ordinary braking system can convert it into one embodying this invention. When desired, the brake system of this invention may employ an indicator such as a light 19 mounted in the cab so that the driver is aware that he is in an emergency stop mode when a light such as 19 becomes illuminated.

What is claimed is:

1. A brake system for a vehicle train including a tractor and a trailer which comprises:
    a. a source of high pressure connected through a control line to operate a pneumatic brake system in a tractor vehicle and in a trailer vehicle,
    b. an electric circuit which, when closed, electrically opens a valve to supply high pressure air directly to the brake system in said trailer vehicle,
    c. a fast-acting pressure switch on said tractor vehicle and in said electric circuit, said fast-acting switch acting responsive to a particular pressure in said control line to close said electric circuit,
    d. a slow-acting pressure switch on said tractor vehicle and in said electric circuit, said slow-acting pressure switch acting responsive to a pressure in said control line that is lower than said particular pressure to open said electric circuit, and
    e. means actuated when both said fast-acting switch and said slow-acting switch are closed to by pass said slow-acting switch.

2. The brake system of claim 1 wherein said fast-acting switch is connected to said control line closely adjacent the source of high pressure air to said control line.

3. The brake system of claim 1 wherein slow-acting switch is connected to said control line downstream of the connection of said fast acting switch.

4. The brake system of claim 1 wherein said slow-acting switch is connected to said control line through a orifice plate which restricts the flow of air from said control line to said slow-acting switch.

* * * * *